United States Patent [19]

Brown

[11] Patent Number: 5,001,201

[45] Date of Patent: Mar. 19, 1991

[54] ARYLOXYTRIAZINE-CAPPED POLYPHENYLENE ETHERS AND METHOD FOR THEIR PREPARATION

[75] Inventor: Sterling B. Brown, Schenectady, N.Y.

[73] Assignee: General Electric Company, Schenectady, N.Y.

[21] Appl. No.: 319,393

[22] Filed: Mar. 6, 1989

[51] Int. Cl.$^5$ .................... C08G 65/48; C08G 72/12
[52] U.S. Cl. .................................. 525/390; 525/68; 525/92; 525/132; 525/148; 525/149; 525/397; 525/905
[58] Field of Search .................. 525/390, 905

[56] References Cited

U.S. PATENT DOCUMENTS 3,396,146  8/1968  Schmukler .................. 525/397

*Primary Examiner*—Jacob Ziegler
*Attorney, Agent, or Firm*—William H. Pittman; James C. Davis, Jr.

[57] ABSTRACT

Aryloxytriazine-capped polyphenylene ethers are prepared by reaction of a polyphenylene ether with an aryloxychlorotriazine such as diphenyl chlorocyanurate. The products undergo reaction with amine-terminated polymers such as polyamides, to form compositions which have excellent properties and which find utility as molding compositions and as compatibilizers for blends of similar polymers.

17 Claims, No Drawings

ARYLOXYTRIAZINE-CAPPED POLYPHENYLENE ETHERS AND METHOD FOR THEIR PREPARATION

This invention relates to the preparation of aryloxytriazine-capped polyphenylene ethers.

The polyphenylene ethers are a widely used class of thermoplastic engineering resins characterized by excellent hydrolytic stability, dimensional stability, toughness, heat resistance and dielectric properties. However, they are deficient in certain other properties such as workability and solvent resistance. Therefore, there is a continuing search for means for modifying polyphenylene ethers to improve these other properties.

A disadvantage of the polyphenylene ethers which militates against their use for molding such items as automotive parts is their low resistance to non-polar solvents such as gasoline. For increased solvent resistance, it would be desirable to form compositions in which polyphenylene ethers are combined with resins which have a high degree of crystallinity and therefore are highly resistant to solvents. Illustrative of such resins are the thermoplastic polyamides. Other reasons exist for forming compositions comprising polyphenylene ethers and such other polyamides as the amorphous and elastomeric species.

However, polyphenylene oxide-polyamide blends frequently undergo phase separation and delamination. They typically contain large, incompletely dispersed polyphenylene ether particles and no phase interaction between the two resin phases. Molded parts made from such blends are typically characterized by extremely low impact strength, brittleness, delamination and the like.

Numerous methods for compatibilizing polyphenylene ether-polyamide compositions have been developed. For example, U.S. Pat. No. 4,315,086 and copending, commonly owned application Ser. No. 736,489, filed May 20, 1985, describe the use for this purpose of various polyfunctional compounds, including olefinic and acetylenic carboxylic acids, polycarboxylic acids and functional derivatives thereof.

A very effective way of compatibilizing polyphenylene ether-polyamide compositions is by the formation of a copolymer of the two resins. This may be achieved by the incorporation of a polyamide-reactive functional group on the polyphenylene ether. Groups suitable for this purpose include carboxylic acid groups as in U.S. Pat. Nos. 4,600,741 and 4,732,938 and copending, commonly owned application Ser. No. 885,497, filed July 14, 1986.

Another particularly suitable polyamide-reactive functional group is the epoxy group. Various methods of attaching epoxy groups to polyphenylene ethers have been disclosed. For example, U.S. Pat. No. 4,460,743 describes the reaction of a polyphenylene ether with epichlorohydrin; U.S. Pat. No. 4,732,937 the reaction with terephthaloyl chloride and glycidol; copending, commonly owned application Ser. No. 912,705, filed Sept. 29, 1986, the reaction with various epoxy-functionalized ethylenic monomers such as glycidyl acrylate, glycidyl methacrylate and allyl glycidyl ether in the presence of free radical initiators; and application Ser. No. 286,184, filed Dec. 19, 1988, the reaction with an epoxychlorotriazine.

It has now been discovered that certain aryloxytriazine-capped polyphenylene ethers form compatible, ductile compositions having relatively high impact strengths and other favorable properties when blended with polyamides. It is believed that a copolymer of the polyphenylene ether with the polyamide is formed by displacement of an aryloxy group by an amine end group in the polyamide.

In one of its aspects, therefore, the invention includes aryloxytriazine-capped polyphenylene ether compositions comprising polymer molecules having end groups of the formula

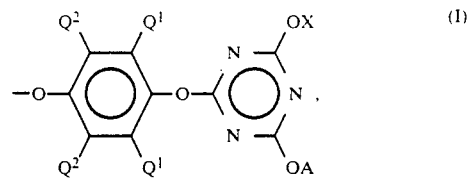

wherein:
each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms;
each $Q^2$ is independently hydrogen, halogen, primary or secondary lower alkyl, phenyl, haloalkyl, hydrocarbonoxy or halohydrocarbonoxy as defined for $Q^1$;
A is an unsubstituted or substituted aromatic radical; and
X is an alkyl or cycloalkyl or an unsubstituted or substituted aromatic radical.

Said aryloxytriazine-capped polyphenylene ethers may be prepared as described hereinafter from the polyphenylene ethers known in the art. The latter encompass numerous variations and modifications all of which are applicable to the present invention, including but not limited to those described hereinafter.

The polyphenylene ethers comprise a plurality of structural units having the formula

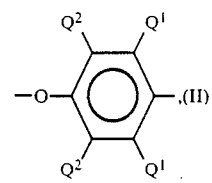

and in each of said units independently, each $Q^1$ and $Q^2$ is as previously defined. Examples of primary lower alkyl groups suitable as $Q^1$ and $Q^2$ are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units.

Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent, provided substantial proportions of free hydroxy groups remain present. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ are methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

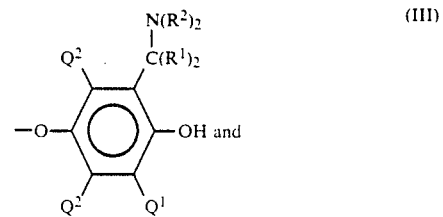

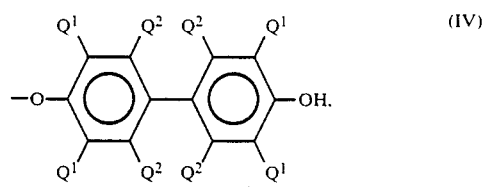

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the aminoalkyl-substituted end groups of formula III may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

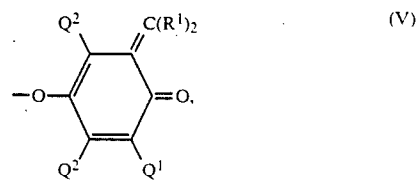

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula IV are typically obtained from reaction mixtures in which a by-product diphenoquinone of the formula

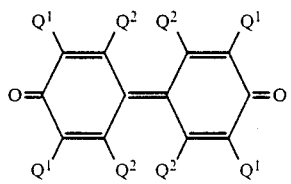

(VI)

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas III and IV. It should be understood, however, that other end groups may be present and that the invention in its broadest sense may not be dependent on the molecular structures of the polyphenylene ether end groups, provided a substantial proportion of free hydroxy groups is present.

It will be apparent to those skilled in the art from the foregoing that the polyphenylene ethers contemplated for use in the present invention include all those presently known, irrespective of variations in structural units or ancillary chemical features.

The end groups on the aryloxytriazine-capped polyphenylene ethers of this invention have formula I, in which $Q^1$ and $Q^2$ are as previously defined. The X value may be an alkyl or cycloalkyl radical, typically lower alkyl, or an aromatic radical, typically containing 6–10 carbon atoms and especially an aromatic hydrocarbon radical; and A is an identical aromatic radical or a different radical of the same type.

When X is an alkyl or cycloalkyl radical, it is often preferably sterically hindered to prevent nucleophilic attack on said radical by the amino nitrogen atom of the polyamide, to form an alkylated amine group. Sterically hindered radicals include secondary and tertiary radicals, as well as primary alkyl radicals which are highly branched on atoms close to the 1-carbon atom; e.g., neoalkyl.

Most often, both A and X are phenyl or are substituted phenyl. Substituted phenyl groups in which the substituents have several identical hydrogen atoms, such as t-butylphenyl and methoxyphenyl, have the advantage of affording products in which the proportion of capping may be determined by proton nuclear magnetic resonance, utilizing the protons on the t-butyl or methoxy group. (The same is true when X is methyl or t-butyl.) On the other hand, electron-withdrawing substituents such as halo, carboxy, carbalkoxy, nitrile, nitro, acyl and aldehyde groups may promote displacement by the amine groups in the polyamide by reason of the lower pKa of the conjugate acid of the displaced aryloxide anion.

Another aspect of the invention is a method for preparing the above-described aryloxytriazine-capped polyphenylene ether compositions. Said method comprises contacting under reactive conditions, in the presence of a basic reagent, at least one polyphenylene ether with an aryloxychlorotriazine of the formula

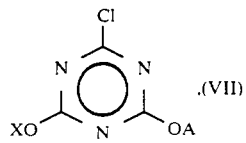

.(VII)

wherein A and X are as previously defined. Typical aryloxychlorotriazines of formula VII include 2-chloro-4,6-diphenoxy-1,3,5-triazine, 2-chloro-4,6-di-(4-t-butylphenoxy)1,3,5-triazine and 2-chloro-4,6-di-(4-methoxyphenoxy)-1,3,5triazine. These compounds may also be named as though derived from cyanuric acid and designated diphenyl chlorocyanurate, di-(4-t-butylphenyl) chlorocyanurate and di-(4methoxyphenyl) chlorocyanurate, respectively. They may be prepared, for example, by the reaction of 2,4,6-trichlorotriazine (cyanuric chloride) with the corresponding hydroxyaromatic compounds, or sequentially with hydroxyaromatic compounds and aliphatic or alicyclic alcohols. Their preparation is illustrated by the following examples; all percentages in the examples herein are by weight.

Example 1

A 1-liter Morton flask fitted with a dropping funnel and mechanical stirrer was charged with 59 grams (320 0 mmol.) of cyanuric chloride, 60.2 grams (640 mmol.) of phenol and 400 ml. of methylene chloride. There was added over 1 hour, with vigorous stirring, a solution of 25.6 grams (640 mmol.) of sodium hydroxide in 110 ml. of water, as the flask was cooled in an ice bath.

When base addition was complete, the ice bath was removed and stirring was continued for 1 hour, after which the organic layer was separated, washed once with dilute sodium hydroxide solution and twice with sodium chloride solution and dried over magnesium sulfate. Upon filtration and evaporation of the methylene chloride, there was obtained 90.4 grams (94% of theoretical) of crude diphenyl chlorocyanurate. It was shown by high pressure liquid chromatography to contain about 4% triphenyl cyanurate as an impurity. A sample recrystallized from heptane had a melting point of 18–120° C. (literature value 121–123° C.).

Example 2

The procedure of Example 1 was repeated, employing 105.8 grams (700 mmol.) of 4-t-butylphenol in place of the phenol, employing 28.2 grams (700 mmol.) of sodium hydroxide and stirring for 30 minutes after sodium hydroxide addition was complete. There was obtained 116.3 grams (84% of theoretical, assuming pure product) of the desired di-(4-t-butylphenyl) chlorocyanurate.

Example 3

The procedure of Example 2 was repeated, except that 4-methoxyphenol was substituted for the 4-t-butylphenol, base was added over 1¼ hours and the mixture was subsequently stirred for 1 hour. There was obtained 88.2 grams (73% of theoretical, assuming pure product) of the desired crude di-(4-methoxyphenyl) chlorocyanurate.

Various options are available for the reaction of the polyphenylene ether with the aryloxychlorotriazine. In one embodiment, the reaction is conducted in solution in a non-polar organic liquid, typically at a temperature in the range of about 80–150° C. and preferably about 100–125° C. The basic reagent employed in this embodiment should be soluble in the organic liquid and is generally a tertiary amine. Its identity is not otherwise critical, provided it is sufficiently non-volatile to remain in the reaction mixture at the temperatures employed. Pyridine is often preferred.

The amount of aryloxychlorotriazine employed in this embodiment is generally in the range of about 1–20% by weight, based on polyphenylene ether. The amount of basic reagent is an effective amount to promote the reaction; in general, about 1.0–1.1 equivalent thereof per mole of aryloxychlorotriazine is adequate.

In a second, preferred embodiment, the reaction is conducted interfacially in a medium comprising water and an organic liquid as previously described. The basic reagent is a water-soluble base, typically an alkali metal hydroxide and preferably sodium hydroxide. It may be added to the mixture of aryloxychlorotriazine and polyphenylene ether, or may initially react with the polyphenylene ether to form a salt which is then contacted with the aryloxychlorotriazine. There is also employed a phase transfer catalyst. Any of such catalysts which are stable and effective under the prevailing reaction conditions may be used; those skilled in the art will readily perceive which ones are suitable. Particularly preferred are tetraalkylammonium chlorides wherein at least two alkyl groups per molecule, typically 2 or 3, contain about 5–15 carbon atoms.

In this embodiment, reaction temperatures in the range of about 20–70° C. may be employed. The amount of aryloxychlorotriazine is frequently lower than in the previously described embodiment, typically in the range of about 1–6% and preferably about 2–6% by weight based on polyphenylene ether, since the reaction of the aryloxychlorotriazine with the polyphenylene ether apparently proceeds more nearly to completion. Most often, the ratio of equivalents of base to moles of aryloxychlorotriazine is about 1.0–1.5:1, and the weight ratio of phase transfer catalyst to polyphenylene ether is about 0.01–0.03:1. It is frequently preferred to neutralize the reaction mixture with any convenient acidic compound; carbon dioxide, in gaseous, liquid or solid form, is generally suitable.

The preparation of the compositions of this invention is illustrated by the following examples. The degrees of capping in the capped polymers were determined by Fourier transform infrared or nuclear magnetic resonance spectroscopy. The polyphenylene ether employed was a poly(2,6-dimethyl-1,4-phenylene ether) having an intrinsic viscosity in chloroform at 25° C. of 0.40 dl./g.

Example 4

To a solution of 400 grams of polyphenylene ether in 2500 ml. of toluene was added 48 grams of a 10% solution in toluene of a commercially available methyltrialkylammonium chloride in which the alkyl groups contained 8–10 carbon atoms and 16 grams of crude 2-chloro-4,6-diphenoxy-1,3,5-triazine. The resulting solution was vigorously stirred as 24 grams of 10% aqueous sodium hydroxide solution (60 mmol.) was added dropwise over 5 minutes. The mixture was stirred for 30 minutes, after which the organic layer was separated and the capped polyphenylene ether was precipitated by treatment with methanol in a blender. The precipitated product was filtered, washed with methanol and dried in vacuum at 90–110° C. Fourier transform infrared spectroscopic analysis showed the absence of free hydroxy end groups in the product.

Examples 5–8

Following the procedure of Example 4, reactions were conducted between polyphenylene ether and various chlorotriazines, identified in Table I hereinafter by the identities of the X and A groups. After sodium hydroxide addition was complete and the mixtures had been stirred for about ½ hour, they were neutralized by saturation with carbon dioxide gas while stirring and the capped polyphenylene ethers were isolated as previously described. The relevant parameters and test results are given in Table I.

TABLE I

| Example | Aryloxychlorotriazine Phenyl substituent | % | Sodium hydroxide, mmol. | % triazine incorporated* |
|---|---|---|---|---|
| 5 | 4-t-Butyl | 3 | 44 | 2.27 |
| 6 | 4-t-Butyl | 4.5 | 44 | 2.79 |
| 7 | 4-t-Butyl | 5 | 44 | 2.77 |
| 8 | 4-Methoxy | 4 | 47 | 2.35 |

*Based on polyphenylene ether.

The aryloxytriazine-capped polyphenylene ethers of this invention form compatible, ductile compositions with amine-terminated polymers, especially polyamides. Said compositions are disclosed and claimed in copending, commonly owned application Ser. No. 318,996, filed Mar. 6, 1989.

Any polyamide made by any known method may be used, provided it contains a substantial proportion of amine end groups. In many instances, polyamides in which the amine end group concentration is at least about 60 meq./g. are particularly useful. Suitable polyamides include those of the type prepared by the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. The dicarboxylic acid may be used in the form of a functional derivative thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring with the —CO—NH-group in the case of a lactam. As particular examples of aminocarboxylic acids and lactams there may be mentioned ε-aminocaproic acid, butyrolactam, pivalolactam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

Suitable dicarboxylic acids include those which contain an aliphatic or aromatic group containing at least 2 carbon atoms separating the carboxy groups. The aliphatic acids are often preferred; they include sebacic acid, octadecanedioic acid, suberic acid, glutaric acid, pimelic acid and adipic acid.

Both crystalline and amorphous polyamides may be employed, with the crystalline species often being preferred by reason of their solvent resistance. Typical examples of the polyamides or nylons, as these are often called, include, for example, polyamide-6 (polycaprolactam), 66 (polyhexamethylene adipamide), 11, 12, 63, 64, 6/10 and 6/12 as well as polyamides from terephthalic acid and/or isophthalic acid and trimethylhexamethylenediamine; from adipic acid and m-xylylenediamines; from adipic acid, azelaic acid and 2,2-bis(p-aminophenyl)propane or 2,2-bis-(p-aminocyclohexyl)propane and from terephthalic acid and 4,4'-diaminodicyclohexylmethane. Mixtures and/or copolymers of two or more of the foregoing polyamides or prepolymers thereof, respectively, are also within the scope of the present invention. Preferred polyamides are polyamide-6, 66, 11 and 12, most preferably polyamide-66.

For the preparation of polyphenylene etherpolyamide compositions, a blending method which results in the formation of an intimate blend is highly preferred. Suitable procedures include solution blending, although such procedures are of limited applicability to many polyamides by reason of their insolubility in most common solvents. For this reason and because of the availability of melt blending equipment in commercial polymer processing facilities, melt reaction procedures are generally preferred. Conventional melt blending procedures and equipment may be employed, with extrusion often preferred because of its relative convenience and particular suitability. Typical reaction temperatures are in the range of about 175–350° C.

Those skilled in the art will be familiar with blending methods and apparatus capable of intimately blending resinous constituents, especially by kneading. They are exemplified by disc-pack processors and various types of extrusion equipment. Illustrations of the latter are continuous mixers; single screw kneading extruders; corotating, intermeshing and counterrotating, nonintermeshing twin screw extruders having such features as staggered configuration screws, forward-flighted compounders, cylindrical bushings and left-handed screw elements; and extruders having screws which include at least one and preferably two kneading block elements.

It is also contemplated to include in the blending step elastomeric impact modifiers compatible with either or both of the polyphenylene ether and the polyamide.

Impact modifiers for polyphenylene ether-polyamide compositions are well known in the art. They are typically derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials including natural and synthetic polymeric materials showing elasticity at room temperature. They include both homopolymers and copolymers, including random, block, radial block, graft and core-shell copolymers as well as combinations thereof.

Polyolefins or olefin-based copolymers employable in the invention include low density polyethylene, high density polyethylene, linear low density polyethylene, isotactic polypropylene, poly(1-butene), poly(4-methyl-1-pentene), propylene-ethylene copolymers and the like. Additional olefin copolymers include copolymers of one or more α-olefins, particularly ethylene, with copolymerizable monomers including, for example, vinyl acetate, acrylic acid and alkylacrylic acids as well as the ester derivatives thereof including, for example, ethyl acrylate, methyl methacrylate and the like. Also suitable are the ionomer resins, which may be wholly or partially neutralized with metal ions.

A particularly useful class of impact modifiers are those derived from the vinyl aromatic monomers. These include AB and ABA type block and radial block copolymers and vinyl aromatic conjugated diene core-shell graft copolymers.

An especially preferred subclass of vinyl aromatic monomer-derived resins is the block copolymers comprising monoalkenyl arene (usually styrene) blocks and conjugated diene (e.g., butadiene or isoprene) or olefin (e.g., ethylenepropylene, ethylene-butylene) blocks and represented as AB and ABA block copolymers. The conjugated diene blocks may be partially or entirely hydrogenated, whereupon the properties are similar to the olefin block copolymers.

Suitable AB type block copolymers are disclosed in, for example, U.S. Pat. Nos. 3,078,254; 3,402,159; 3,297,793; 3,265,765 and 3,594,452 and UK Patent 1,264,741, all incorporated herein by reference. Exemplary of typical species of AB block copolymers are polystyrene-polybutadiene (SBR), polystyrene-polyisoprene and poly(alpha-methylstyrene)polybutadiene. Such AB block copolymers are available commercially from a number of sources, including Phillips Petroleum under the tradename SOLPRENE.

Additionally, ABA triblock copolymers and processes for their production as well as hydrogenation, if desired, are disclosed in U.S. Pat. Nos. 3,149,182; 3,231,635; 3,462,162; 3,287,333; 3,595,942; 3,694,523 and 3,842,029, all incorporated herein by reference.

Examples of triblock copolymers include polystyrene-polybutadiene-polystyrene (SBS), polystyrene-polyisoprene-polystyrene (SIS), poly(α-methylstyrene)-polybutadiene-poly(α-methylstyrene) and poly(α-methylstyrene)-polyisoprene-poly(α-methylstyrene). Particularly preferred triblock copolymers are available commercially as CARIFLEX®, KRATON D® and KRATON G® from Shell.

Another class of impact modifiers is derived from conjugated dienes. While many copolymers containing conjugated dienes have been discussed above, additional conjugated diene modifier resins include, for example, homopolymers and copolymers of one or more conjugated dienes including, for example, polybutadiene, butadiene-styrene copolymers, iso-prene-isobutylene copolymers, chlorobutadiene polymers, butadiene-acrylonitrile copolymers, polyisoprene, and the like. Ethylene-propylene-diene monomer rubbers may also be used. These EPDM's are typified as comprising predominantly ethylene units, a moderate amount of propylene units and up to about 20 mole percent of non-conjugated diene monomer units. Many such EPDM's and processes for the production thereof are disclosed in U.S. Pat. Nos. 2,933,480; 3,000,866; 3,407,158; 3,093,621 and 3,379,701, incorporated herein by reference.

Other suitable impact modifiers are the core-shell type graft copolymers. In general, these have a predominantly conjugated diene rubbery core or a predominantly cross-linked acrylate rubbery core and one or more shells polymerized thereon and derived from monoalkenylarene and/or acrylic monomers alone or, preferably, in combination with other vinyl monomers. Such core-shell copolymers are widely available commercially, for example, from Rohm and Haas Company under the trade names KM-611, KM-653, KM-330, and are described in U.S. Pat. Nos. 3,808,180; 4,034;013; 4,096,202; 4,180,494 and 4,292,233.

Also useful are the core-shell copolymers wherein an interpenetrating network of the resins employed characterizes the interface between the core and shell. Especially preferred in this regard are the ASA type copolymers available from General Electric Company and sold as GELOY ™ resin and described in U.S. Pat. No. 3,944,631.

In addition, there may be employed the above-described polymers and copolymers having copolymerized therewith or grafted thereon monomers having functional groups and/or polar or active groups. Finally, other suitable impact modifiers include Thiokol rubber, polysulfide rubber, polyurethane rubber, polyether rubber (e.g., polypropylene oxide), epichlorohydrin rubber, ethylene-propylene rubber, thermoplastic polyester elastomers and thermoplastic etherester elastomers.

The proportion of impact modifier or other resinous material is subject to wide variation. Impact modifiers such as diblock or triblock copolymers are usually present in an amount up to about 50 parts per 100 parts of polyphenylene ether.

The order of blending may be varied. It is often found advantageous to employ an extruder which has at least two ports for introduction of ingredients, one such port being downstream from the other. The capped polyphenylene ether and at least a portion of the impact modifier are introduced through the first port and extruded. This portion of the extruder is often preferably vacuum vented. The polyamide and any additional impact modifier are introduced through the downstream port and extrusion is continued, preferably at a lower temperature to minimize degradation of the impact modifier. By this method, optimum dispersion may be achieved.

It is believed that the polyphenylene etherpolyamide compositions prepared as described herein owe their compatibility and favorable properties in large part to copolymer formation, as a result of displacement of aryloxide anions from the triazine ring by the highly nucleophilic amine end groups of the polyamide. So far as is known, this is the first instance of the formation of such a copolymer by a simiple nucleophilic displacement reaction. Thus, said amine groups are believed to react to form copolymer molecules containing linkages of the formula

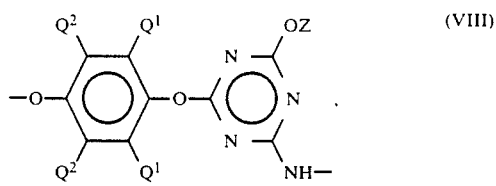

wherein $Q^1$ and $Q^2$ are as previously defined and Z is an alkyl or cycloalkyl or substituted or unsubstituted aromatic radical or —NH—.

The proportions of polyphenylene ether and polyamide are not critical; they may be widely varied to provide compositions having the desired properties. Most often, each polymer is employed in an amount in the range of about 5–95%, preferably about 30–70%, of the composition by weight.

For the most part, the compositions thus obtained are believed to contain various proportions of polyphenylene ether and polyamide homopolymers in addition to copolymer. This may be the result of incorporation of excess polyamide or unfunctionalized polyphenylene ether therein, incomplete capping of the polyphenylene ether, or incomplete reaction of capped polyphenylene ether with polyamide. In any event, molded parts produced from said compositions are generally ductile and have higher impact strengths than those produced from simple polyphenylene ether-polyamide blends, which are incompatible and often exhibit brittleness or delamination as previously described.

There may also be present in the polyphenylene ether-polyamide compositions conventional ingredients such as fillers, flame retardants, pigments, dyes, stabilizers, antistatic agents, crystallization aids, mold release agents and the like, as well as resinous components not previously discussed.

The preparation of polyphenylene ether-polyamide copolymer compositions from the aryloxytriazine-capped polyphenylene ethers of this invention is illustrated by the following examples. All parts and percentages are by weight. The impact modifier used in each example, unless otherwise specified, was a commercially available triblock copolymer with polystyrene end blocks having weight average molecular weights of 29,000 and a hydrogenated butadiene midblock having a weight average molecular weight of 116,000.

Examples 9–10

Blends of 49% of the aryloxytriazine-capped polyphenylene ether of Example 4, 41% of various commercially available polyamide-66 resins having amine end group concentrations less than 60 meq./g. and 10% impact modifier were mixed on a jar mill for 15 minutes and extruded on a 20-mm. counterrotating, non-intermeshing twin screw extruder, at temperatures from 120° C. to 290° C. The extrudates were quenched in water, pelletized, dried for 2–4 hours at 100–120° C. and molded into test specimens which were tested for notched Izod impact strength and tensile properties (ASTM procedures D256 and D638, respectively) and heat distortion temperature at 0.455 MPa. (ASTM procedure D648).

The test results are given in Table II, in comparison with a control in which the aryloxytriazine-capped polyphenylene ether was replaced by an uncapped polyphenylene ether having an intrinsic viscosity of 0.43 dl./g. No delamination of any test specimen was observed.

TABLE II

| | Example | | |
|---|---|---|---|
| | 9 | 10 | Control |
| Polyamide | 66 | 6 | 66 |
| Izod impact strength, joules/m. | 710 | 716 | 16 |
| Tensile strength, MPa.: | | | |
| At yield | 53.8 | 52.6 | 51.1 |

TABLE II-continued

| | Example 9 | 10 | Control |
|---|---|---|---|
| At break | 62.0 | 61.5 | 51.1 |
| Tensile elongation, % | 175 | 219 | 11 |
| Heat distortion temp., °C. | 190 | — | — |

The improvement in impact strength of the compositions of this invention, as compared to the control, is evident. Tensile properties are also superior, as evidenced by the increase in elongation and the substantially higher tensile strength at break than at yield, in comparison with the control which was brittle and whose break and yield values were identical.

Examples 11-16

Polyphenylene ether-polyamide compositions similar to those of Examples 9-10 were prepared from the aryloxytriazine-capped polyphenylene ether of Example 5, impact modifier and various commercially available polyamide-6 and polyamide-66 resins having amine end group concentrations below and above 60 meq./g. (designated "L" and "H", respectively).

The test results are given in Table III, in comparison with controls prepared from uncapped polyphenylene ether. No delamination was observed, except for slight skin delamination in Examples 15 and 16.

TABLE III

| | Example 11 | 12 | 13 | Control 1 | Example 14 | 15 | 16 | Control 2 |
|---|---|---|---|---|---|---|---|---|
| Polyphenylene ether, %: | | | | | | | | |
| Uncapped | — | — | — | 49 | — | — | 24.5 | 49 |
| Ex. 5 | 49 | 49 | 49 | — | 49 | 49 | 24.5 | — |
| Polyamide, %: | | | | | | | | |
| 66 L | 41 | — | 20.5 | — | — | 20.5 | — | — |
| 66 H | — | 41 | 20.5 | 41 | — | — | — | — |
| 6 H | — | — | — | — | 41 | 20.5 | 41 | 41 |
| Izod impact strength, joules/m. | 192 | 753 | 230 | 37 | 945 | 983 | 924 | 48 |
| Tensile strength, MPa.: | | | | | | | | |
| At yield | 52.3 | 53.3 | 51.7 | 52.4 | 52.3 | 50.2 | 53.0 | 49.6 |
| At break | 54.0 | 55.6 | 53.2 | 52.4 | 56.9 | 57.3 | 56.3 | 46.8 |
| Tensile elongation, % | 111 | 122 | 101 | 11 | 179 | 195 | 158 | 19 |

Examples 17-18

The procedure of Examples 9-10 was repeated, substituting the aryloxytriazine-capped polyphenylene ether of Example 8 for that of Example 4. The results are given in Table IV; no delamination was observed.

TABLE IV

| | Example 17 | 18 |
|---|---|---|
| Polyamide | 66 L | 6 H |
| Izod impact strength, joules/m. | 294 | 961 |
| Tensile strength, MPa.: | | |
| At yield | 50.0 | 47.8 |
| At break | 56.2 | 58.2 |
| Tensile elongation, % | 152 | 167 |

Example 19

The procedure of Example 9 was repeated, employing the same resinous constituents but substituting for the 20-mm. extruder a 28-mm. corotating, intermeshing twin screw extruder which was vacuum vented and contained kneading block elements. Four runs were made at various screw speeds and feed rates. The results are given in Table V; no delamination was observed.

TABLE V

| Screw speed, rpm. | 300 | 300 | 200 | 200 |
|---|---|---|---|---|
| Feed rate, kg./hr. | 18.2 | 9.1 | 11.8 | 9.1 |
| Izod impact strength, joules/m. | 320 | 342 | 384 | 256 |
| Tensile strength, MPa.: | | | | |
| At yield | 51.5 | 50.6 | 51.4 | 52.4 |
| At break | 58.4 | 63.1 | 54.2 | 65.1 |
| Tensile elongation, % | 147 | 205 | 101 | 210 |

What is claimed is:

1. An aryloxytriazine-capped polyphenylene ether composition comprising polymer molecules having end groups of the formula

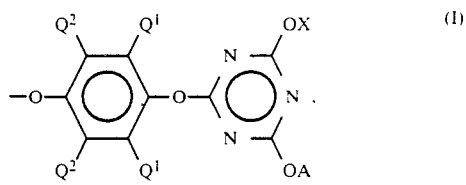

wherein:
each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; each $Q^2$ is independently hydrogen, halogen, primary or secondary lower alkyl, phenyl, haloalkyl, hydrocarbonoxy or halohydrocarbonoxy as defined for $Q^1$;
A is an unsubstituted or substituted aromatic radical; and
X is an alkyl or cycloalkyl radical or an unsubstituted or substituted aromatic radical.

2. A composition according to claim 1 wherein the polyphenylene ether comprises a plurality of structural units having the formula

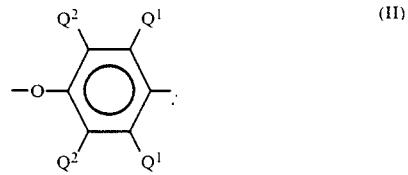

3. A composition according to claim 2 wherein X is aromatic.

4. A composition according to claim 3 wherein the polyphenylene ether is a poly(2,6-dimethyl-1,4-phenylene ether.

5. A composition according to claim 4 wherein both A and X are phenyl or substituted phenyl.

6. A composition according to claim 4 wherein both A and X are unsubstituted phenyl.

7. A method for preparing an aryloxytriazine-capped polyphenylene ether which comprises contacting under reaction conditions, in the presence of a basic reagent, at least one polyphenylene ether with an aryloxychlorotriazine of the formula

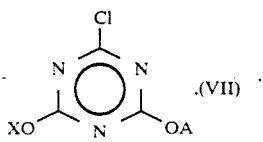

wherein A is an unsubstituted or substituted aromatic radical and X is an alkyl or cycloalkyl radical or an unsubstituted or substituted aromatic radical.

8. A method according to claim 7 wherein the polyphenylene ether is a poly(2,6-dimethyl-1,4-phenylene ether).

9. A method according to claim 8 wherein the reaction is conducted interfacially at a temperature in the range of about 20–70° C., in a medium comprising water and a non-polar organic liquid, the basic reagent is a water-soluble base, and a phase transfer catalyst is also employed.

10. A method according to claim 9 wherein the basic reagent is sodium hydroxide, the organic liquid is toluene and the phase transfer catalyst is a tetraalkylammonium chloride wherein at least two alkyl groups per molecule contain about 5–15 carbon atoms.

11. A method according to claim 10 wherein the amount of aryloxychlorotriazine is in the range of about 1–6% by weight, based on polyphenylene ether; the ratio of equivalents of base to moles of aryloxychlorotriazine is about 1.0–1.5:1; and the weight ratio of phase transfer catalyst to base is about 0.1–0.3:1.

12. A method according to claim 11 wherein both A and X are phenyl or substituted phenyl.

13. A method according to claim 12 wherein both A and X are unsubstituted phenyl.

14. A method according to claim 11 wherein the reaction mixture is subsequently neutralized with an acidic compound.

15. A method according to claim 14 wherein the acidic compound is carbon dioxide.

16. A composition prepared by the method of claim 7.

17. A composition prepared by the method of claim 10.

* * * * *